(12) United States Patent
Jaeger et al.

(10) Patent No.: US 10,191,143 B2
(45) Date of Patent: Jan. 29, 2019

(54) METHOD AND APPARATUS FOR CALIBRATING AN IQ MODULATOR

(71) Applicant: Infineon Technologies AG, Neubiberg (DE)

(72) Inventors: Herbert Jaeger, Linz (AT); Clemens Pfeffer, Linz (AT)

(73) Assignee: Infineon Technologies AG, Neubiberg (DE)

( * ) Notice: Subject to any disclaimer, the term of this patent is extended or adjusted under 35 U.S.C. 154(b) by 344 days.

(21) Appl. No.: 15/196,560

(22) Filed: Jun. 29, 2016

(65) Prior Publication Data
US 2017/0031005 A1    Feb. 2, 2017

(30) Foreign Application Priority Data

Jul. 29, 2015   (DE) .......................... 10 2015 112 392

(51) Int. Cl.
*G01S 7/35*   (2006.01)
*G01S 7/40*   (2006.01)
(Continued)

(52) U.S. Cl.
CPC .............. *G01S 7/4004* (2013.01); *G01S 7/35* (2013.01); *G01S 7/352* (2013.01); *G01S 7/4021* (2013.01);
(Continued)

(58) Field of Classification Search
CPC ............ A63B 24/0062; A63B 24/0075; G01S 13/343; G01S 2007/358; G01S 7/35;
(Continued)

(56) References Cited

U.S. PATENT DOCUMENTS 4,968,968 A   11/1990   Taylor
5,264,855 A   11/1993   Lammers et al.
(Continued)

FOREIGN PATENT DOCUMENTS

WO    2013/052234    4/2013

OTHER PUBLICATIONS

Pfeffer et al., "An IQ-Modulator Based Heterodyne 77-GHz FMCW Colocated MIMO Radar System," http://ieeexplore.ieee.org/xpl/login.jsp?tp=&arnumber=6258387&url=http%3A%2F%2Fieeexplore.ieee.org%2Fxpls%2Fabs_all.jsp%3Farnumber%3D6258387, Jun. 17-22, 2012, 3 pages.
(Continued)

*Primary Examiner* — Timothy A Brainard
(74) *Attorney, Agent, or Firm* — Harrity & Harrity, LLP

(57) ABSTRACT

The present disclosure relates to a concept for calibrating an IQ modulator. A calibration method comprises setting one or more control values of the IQ modulator corresponding to a desired constellation point of a constellation diagram to generate an IQ modulating signal; mixing the IQ modulating signal with a carrier signal to generate an IQ modulated transmit signal; transmitting the IQ modulated transmit signal towards a predefined object at a predefined location; receiving a reflection of the IQ modulated transmit signal from the predefined object; mixing the received reflection of the IQ modulated transmit signal with the carrier signal to generate a down-converted receive signal; comparing amplitude and/or phase of the down-converted receive signal with the desired constellation point of the constellation diagram; and adjusting the one or more control values of the IQ modulator until a deviation between the amplitude and/or phase of the received down-converted signal and the desired constellation point falls below a predefined threshold.

15 Claims, 17 Drawing Sheets

(51) Int. Cl.
  *H04L 27/36* (2006.01)
  *G01S 13/34* (2006.01)
(52) U.S. Cl.
  CPC ............ *G01S 13/343* (2013.01); *H04L 27/36* (2013.01); *G01S 2007/358* (2013.01)
(58) Field of Classification Search
  CPC ...... G01S 7/352; G01S 7/4004; G01S 7/4021; G06F 19/3481; H04L 27/36
  USPC ........................................................ 342/174
  See application file for complete search history.

(56) References Cited

U.S. PATENT DOCUMENTS

| | | |
|---|---|---|
| 6,763,227 B2 | 7/2004 | Kramer |
| 6,771,709 B2 | 8/2004 | Huang et al. |
| RE40,056 E * | 2/2008 | Heath, Jr. .............. H01Q 1/246 |
| | | 375/267 |
| 7,570,201 B1 | 8/2009 | Watkins et al. |
| 7,773,205 B2 | 8/2010 | Cooper et al. |
| 8,280,312 B2 | 10/2012 | Boe et al. |

OTHER PUBLICATIONS

Tait, "Introduction to Radar Target Recognition," The Institution of Electrical Engineering and Technology, 2005, 5 pages.

* cited by examiner

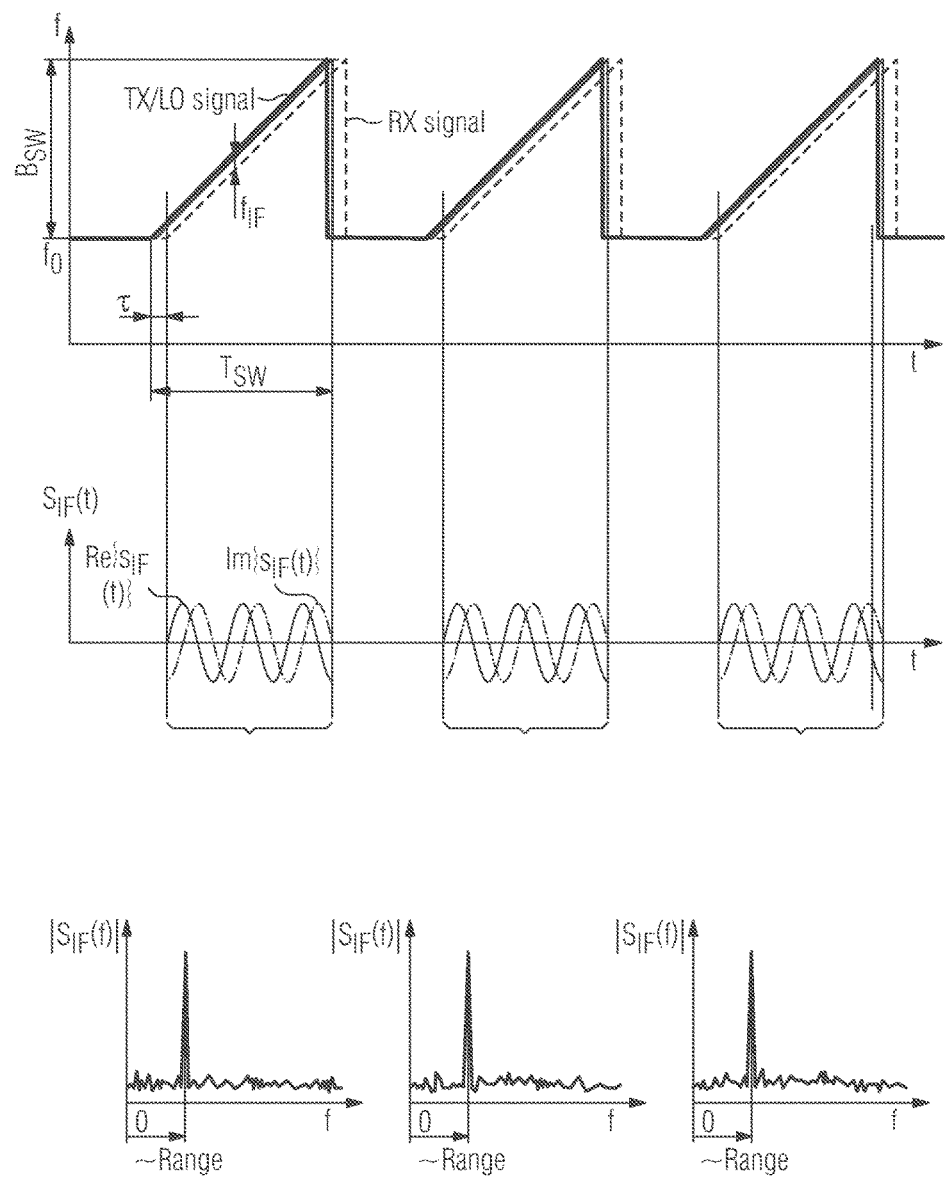

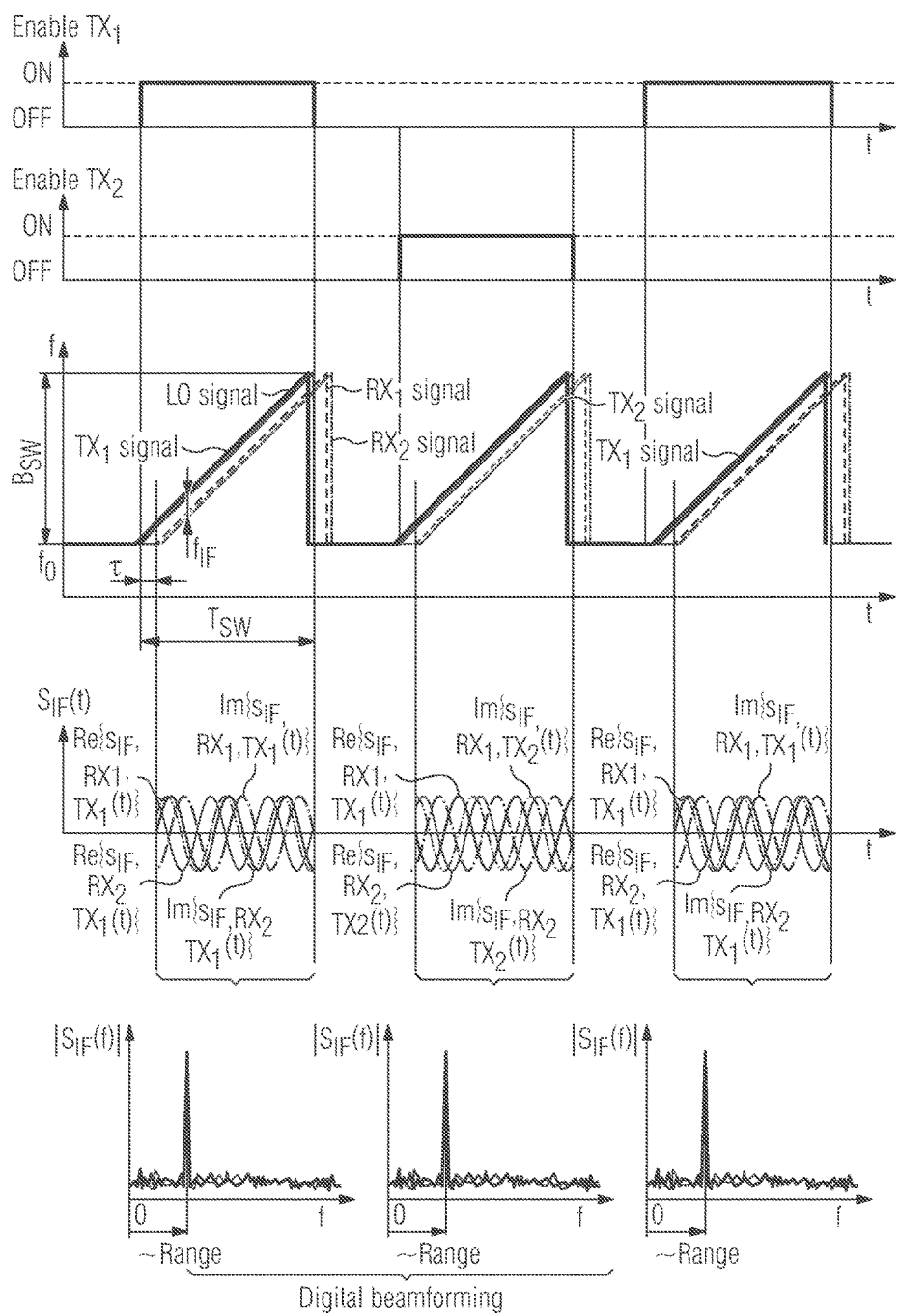

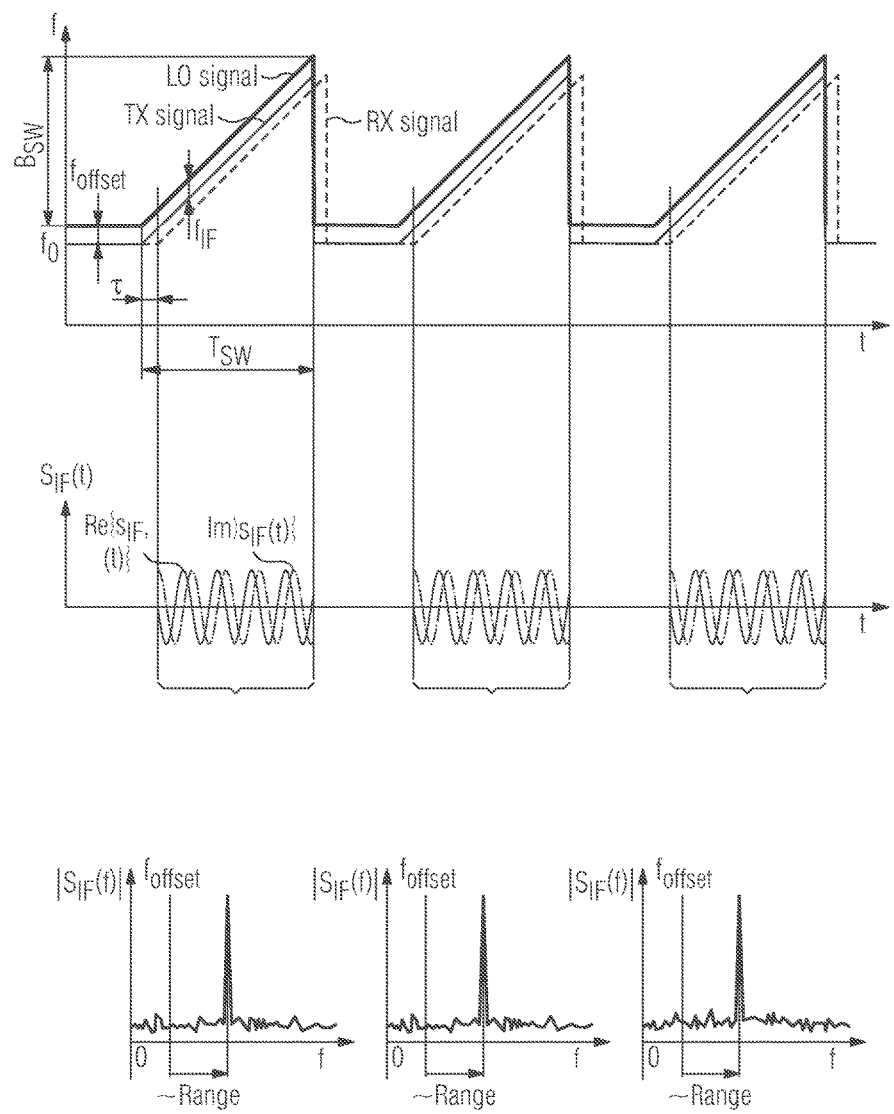

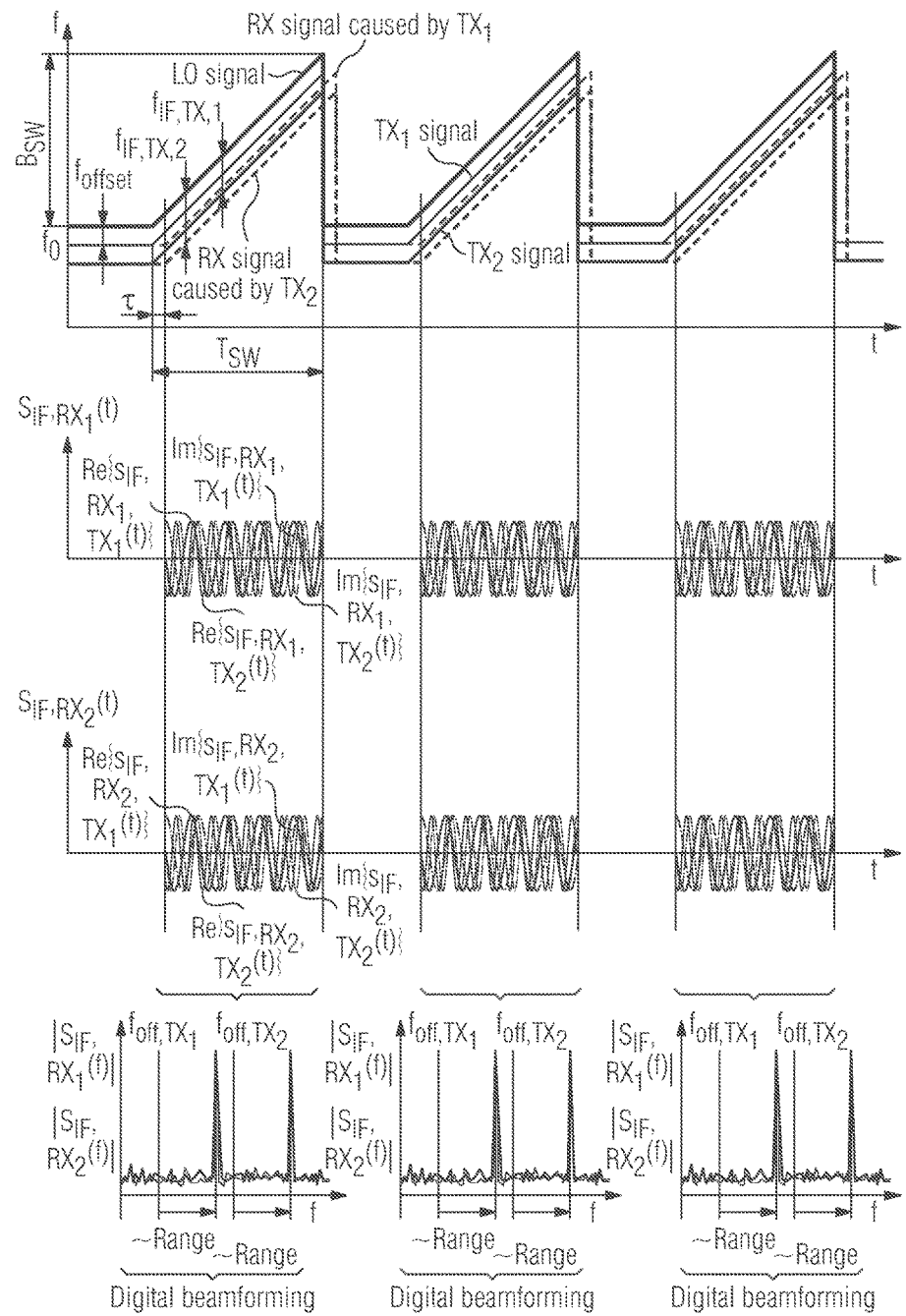

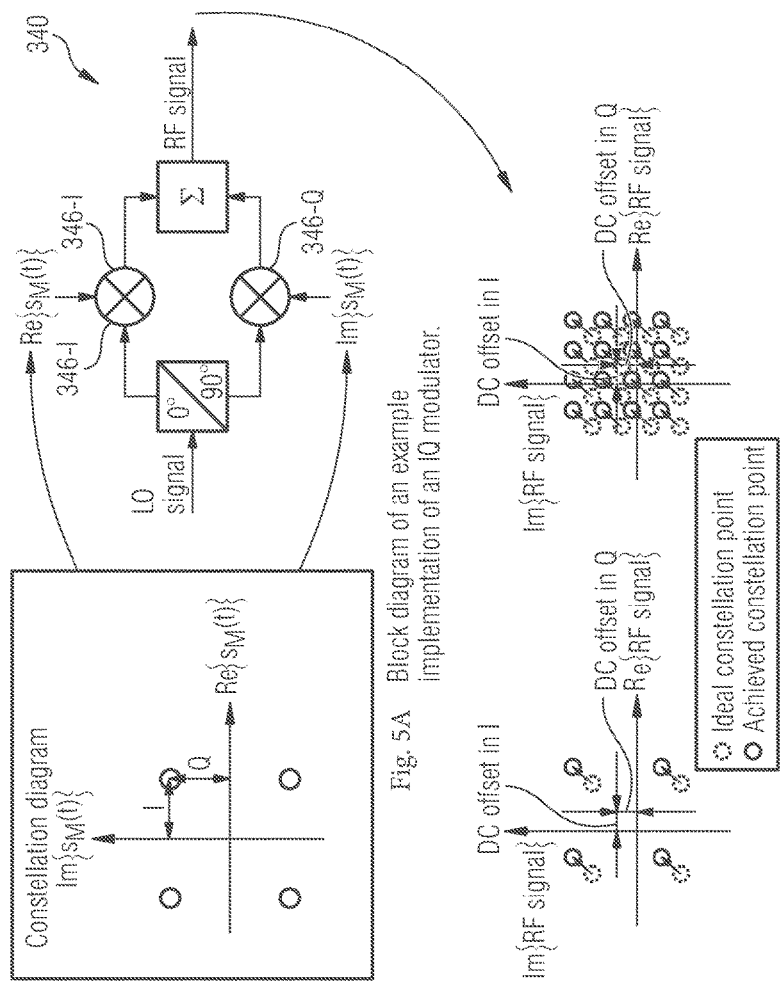

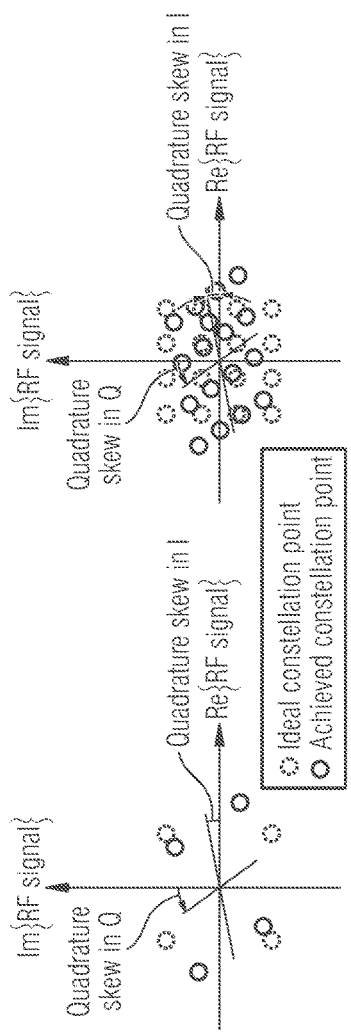
Fig. 5C Quadrature Skew 4-QAM and 16-QAM.
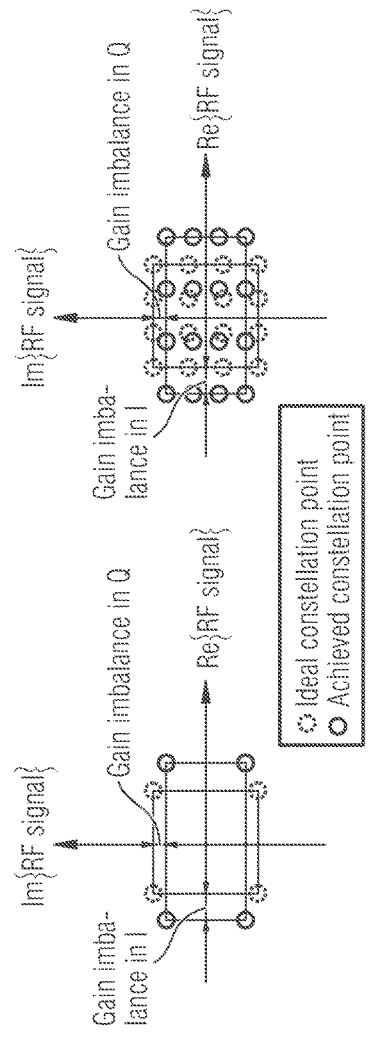
Fig. 5D IQ Gain Imbalance ein 4-QAM and 16-QAM.

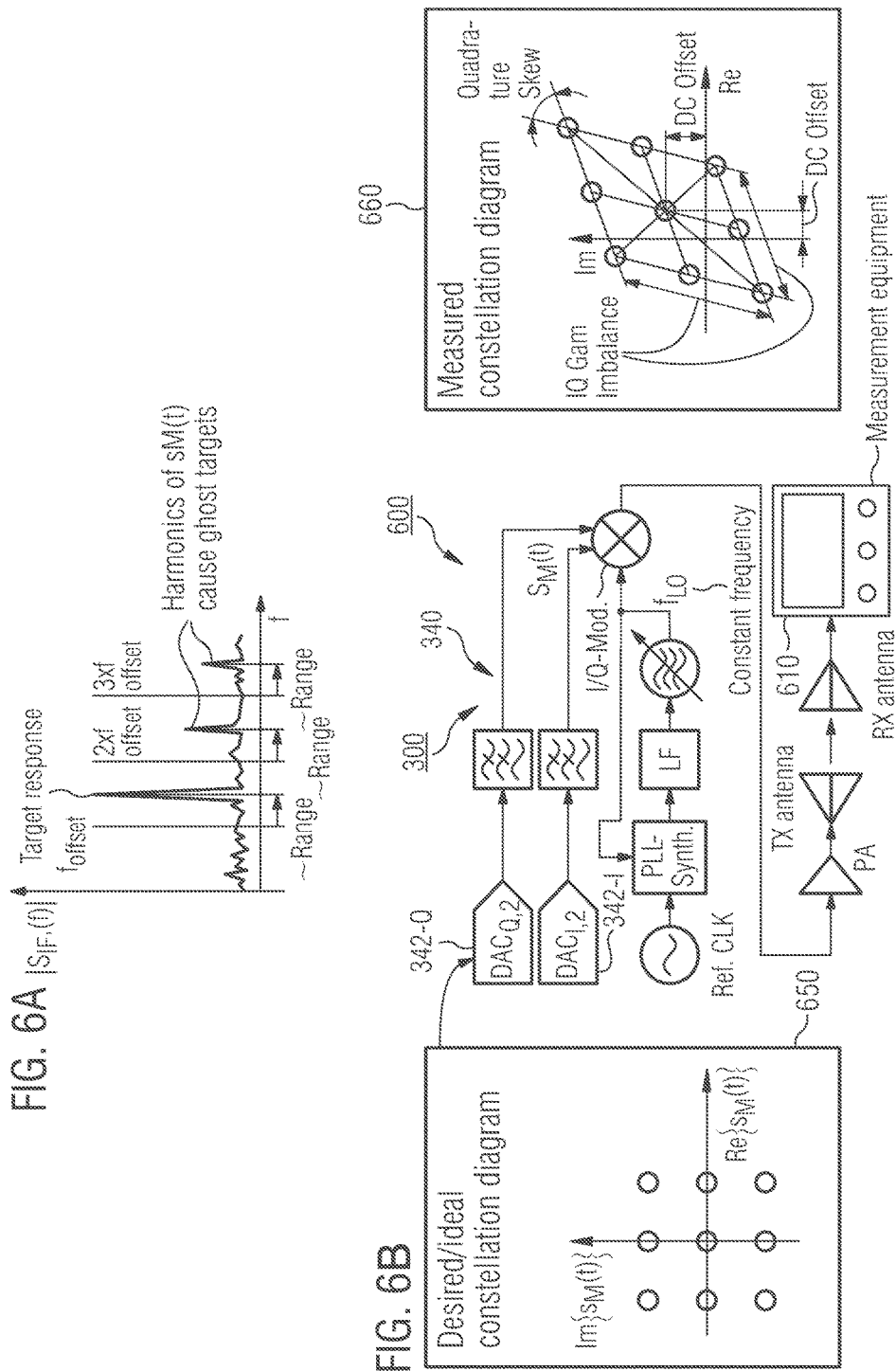

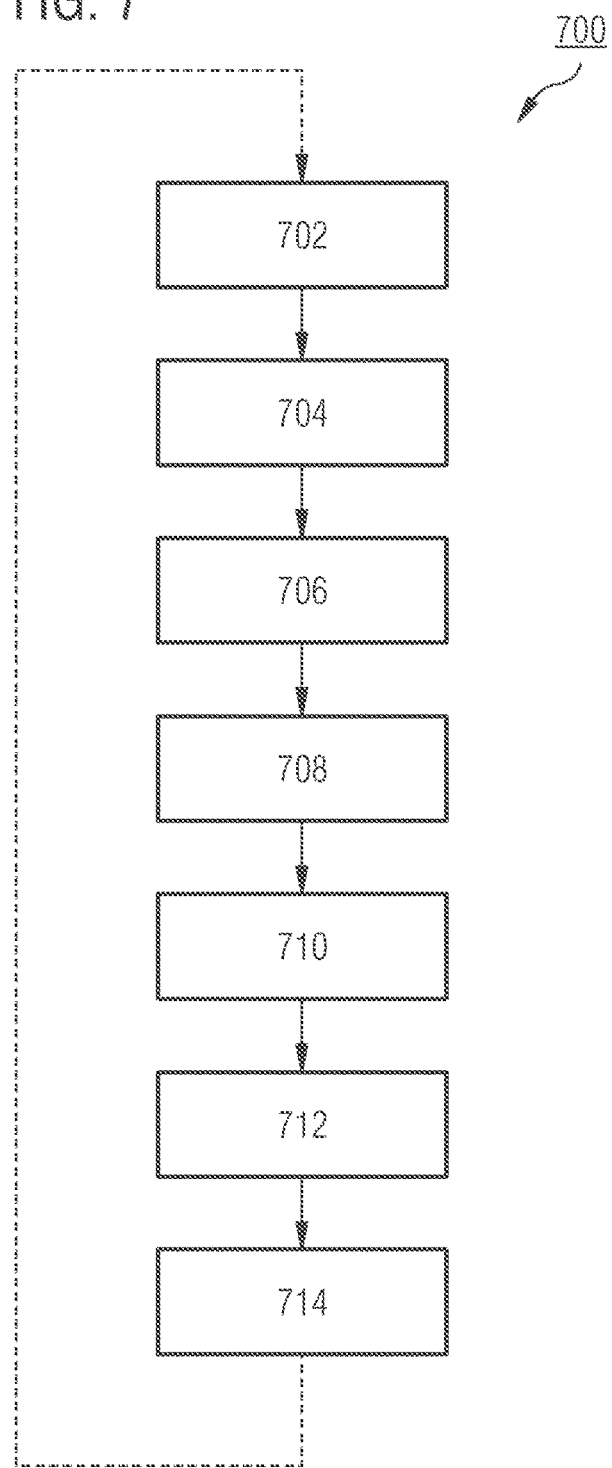

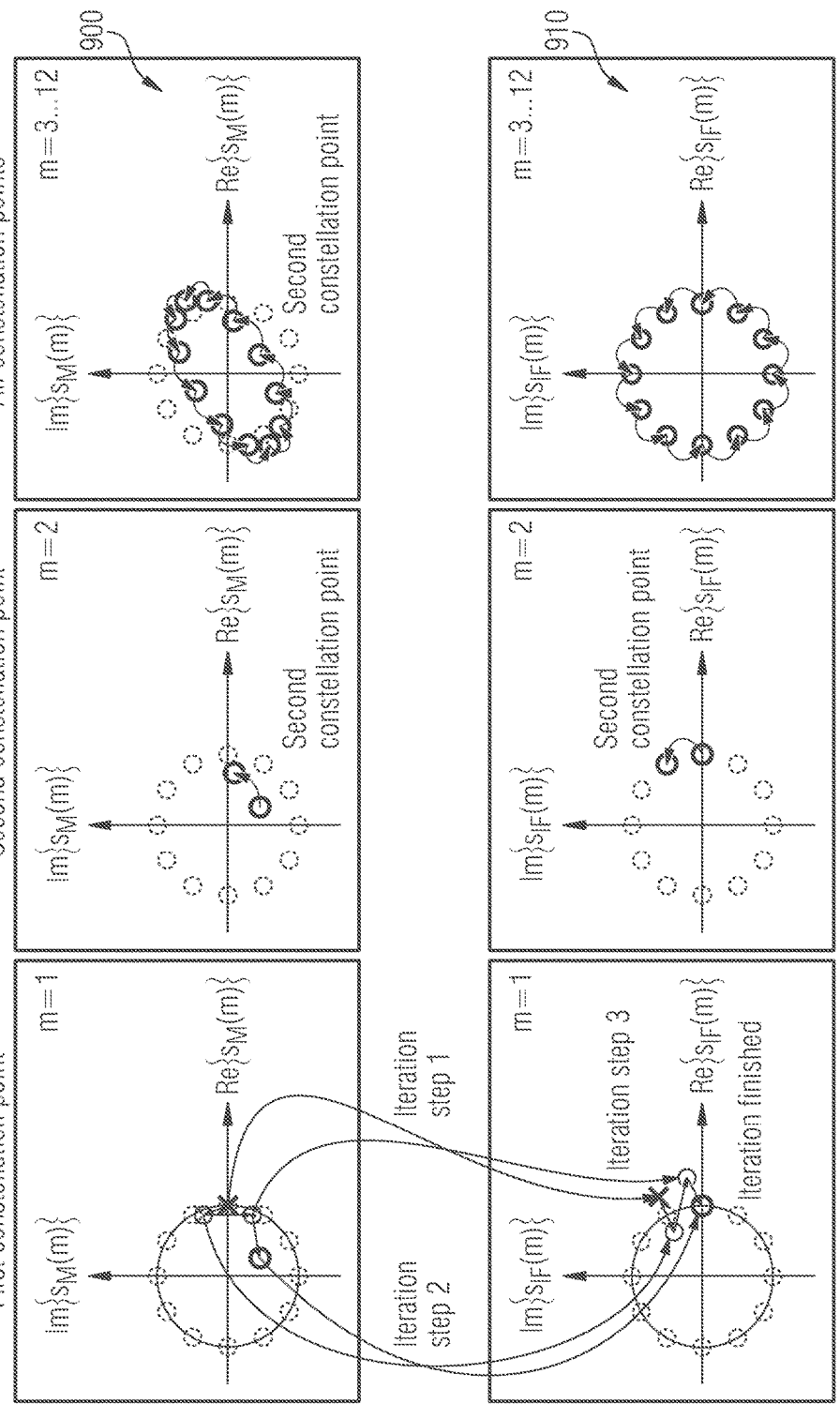

METHOD AND APPARATUS FOR CALIBRATING AN IQ MODULATOR

RELATED APPLICATION

This application claims priority under 35 U.S.C. § 119 to German Patent Application No. 102015112392.4, filed on Jul. 29, 2015, the content of which is incorporated by reference herein in its entirety.

FIELD

Embodiments generally relate to communications systems, and, more particularly, to methods and apparatuses for calibrating IQ modulators of communications devices, such as radar devices, for example.

BACKGROUND

A modulation technique that lends itself well to digital communications is the so-called IQ modulation. Here, "I" denotes the so-called "In-phase" component of a waveform, and "Q" denotes the so-called "Quadrature" component. IQ modulation can be performed using IQ modulators.

An IQ modulator is a critical component in the signal chain for digital transmitters. IQ modulators perform the frequency translation that mixes a baseband signal to a desired location in the Radio Frequency (RF) spectrum. An IQ modulator typically comprises a Local Oscillator (LO) input that is split into In-phase (I) and Quadrature (Q) components which are separated by 90°. These two signals may drive separate mixers that are also driven by I- and Q-baseband signals. The outputs from both mixers are then summed to provide a modulated carrier either at RF or Intermediate Frequency (IF).

In radar systems, for example, such as Multiple-Input Multiple-Output (MIMO) Frequency-Modulated Continuous-Wave (FMCW) radar systems, an IQ modulator may be used as Single Side-Band (SSB) mixer for an up or down conversion of the LO signal. A complex sinusoidal signal which may be generated in baseband may be applied as control signal of the IQ modulator in order to shift the LO signal in frequency for an arbitrary value. In this way multiple radar transmitters can be activated at the same time. Such a radar system may be referred to as Frequency-Division Multiple-Access (FDMA) FMCW MIMO radar.

The performance of the IQ modulator influences the overall performance of communications systems such as radar systems. Because of non-ideal behavior of the IQ modulator there is the need for calibration. Model based approaches for the calibration of an IQ modulator are well known but have their disadvantages.

It is therefore desirable to provide improved techniques for calibrating IQ modulators.

SUMMARY

An embodiment of the present disclosure relates to a method for calibrating an IQ modulator. The method comprises setting one or more control values of the IQ modulator corresponding to a desired constellation point of a constellation diagram to generate an IQ modulating signal. The IQ modulating signal is then mixed with a carrier signal to generate an IQ modulated transmit signal. The IQ modulated transmit signal is transmitted towards a predefined object at a predefined location. A reflection of the IQ modulated transmit signal is received from the predefined object. The received reflection of the IQ modulated transmit signal is mixed with the carrier signal to generate a down-converted receive signal. An amplitude and/or phase of the down-converted receive signal is compared with the desired constellation point of the constellation diagram. The one or more control values of the IQ modulator are adjusted until a deviation between the amplitude and/or phase of the received down-converted signal and the desired constellation point falls below a predefined threshold.

In some embodiments, the comparison with the desired constellation point and the adjustment of the IQ modulator control value(s) may be performed iteratively until the deviation between the amplitude and/or phase of the down-converted receive signal and the desired constellation point falls below the predefined threshold. Hence, the method may be regarded as in iterative method.

In some embodiments, the acts of the above method may be performed iteratively for each constellation point of the constellation diagram in order to obtain a calibration with respect to all constellation points of the constellation diagram.

In some embodiments, the constellation diagram may be a circular constellation diagram, i.e., the individual constellation points may be located on a circle in the IQ plane.

In some embodiments, for example related to FMCW radar systems, generating the carrier signal may include varying a carrier frequency of the carrier signal according to a predefined carrier frequency ramp. When setting the one or more control values of the IQ modulator, the control values may be kept constant during the duration of one carrier frequency ramp.

Some embodiments may include performing a time-to-frequency domain transformation of the down-converted receive signal, for example, using a Fast Fourier Transformation (FFT).

In some embodiments, one or more IQ modulator control values corresponding to the desired constellation point may be stored in a computer memory when the deviation between the amplitude and/or phase of the down-converted receive signal and the desired constellation point falls below the predefined threshold.

To reduce computer memory requirements, some embodiments may include estimating a control value curve using a curve fitting technique. Curve fitting may be performed based on respective adjusted control values of the IQ modulator corresponding to respective desired constellation points of the constellation diagram. The parameters describing the estimated curve may be stored in a computer memory.

In some embodiments, the IQ modulated transmit signal is transmitted using a transmitter portion of a transceiver hardware and the reflection of the IQ modulated transmit signal is received using a receiver portion of the same transceiver hardware. Thereby a transceiver is a device comprising both a transmitter and a receiver which are combined and share common circuitry or a single housing. Hence, no external measurement devices may be required. For example, the transceiver hardware may be embedded in a radar sensor.

In some embodiments, the predefined object for reflecting radiation may be located in an anechoic chamber.

According to a further aspect, the present disclosure also provides a calibration system. The calibration system comprises an IQ modulator and a controller configured to set one or more control values of the IQ modulator corresponding to a desired constellation point of a constellation diagram to generate an IQ modulating signal. A first mixer of the calibration system is configured to mix the IQ modulating signal with an RF carrier signal to generate an IQ modulated transmit signal. Transmitter circuitry of the calibration system is configured to transmit the IQ modulated transmit signal towards a predefined object at a predefined location. Receiver circuitry of the calibration system is configured to receive a reflection of the IQ modulated transmit signal from the predefined object. A second mixer of the calibration system is configured to mix the received reflection of the IQ modulated transmit signal with the RF carrier signal to generate a down-converted receive signal. A processor is configured to compare an amplitude and/or phase of the down-converted receive signal with the desired constellation point of the constellation diagram and is further configured to adjust the one or more control values of the IQ modulator until a deviation between the amplitude and/or phase of the received down-converted signal and the desired constellation point falls below a predefined threshold.

In some embodiments, the calibration system may be implemented in a radar transceiver or at least include a radar transceiver. The transmitter and receiver circuitry may both be portions of the same radar transceiver. In other words, transmitter and receiver circuitry may be collocated in the same housing. Hence, no further external measurement devices may be required.

In some embodiments, the radar transceiver is a FMCW radar transceiver, in particular a multichannel FMCW radar transceiver, and comprises a carrier signal generator which is configured to generate the carrier signal by varying a carrier frequency of the carrier signal according to a predefined carrier frequency ramp over a predefined period of time.

In some embodiments, the processor is configured to perform an FFT of the down-converted receive signal and to derive I and Q values of a received constellation point from the frequency domain signal.

Embodiments of the present disclosure do not require additional measurement equipment besides a transceiver including the IQ modulator, transmitter, and receiver. There is no need for knowledge of amplitude and phase behavior over the whole IQ-range. The iteration process may deliver IQ-settings right at the power level of interest.

BRIEF DESCRIPTION OF THE FIGURES

Some embodiments of apparatuses and/or methods will be described in the following by way of example only, and with reference to the accompanying figures, in which FIGS. 1A and 1B show block diagrams of a single channel FMCW radar system;

FIGS. 2A and 2B illustrate an example of a multichannel Time Division Multiple Access (TDMA) MIMO radar system;

FIGS. 3A and 3B show an example of a single channel FMCW radar system, which can be operated in heterodyne mode;

FIGS. 4A and 4B show an example of a dual channel FDMA FMCW radar system;

FIGS. 5A-5D illustrate an IQ modulator, a constellation diagram, and sources of error;

FIG. 6A shows an example of ghost targets;

FIG. 6B illustrates a conventional measurement setup used for calibration of an IQ modulator;

FIG. 7 shows a flow-chart of a method for calibrating an IQ modulator according to an embodiment;

FIG. 9 shows a consecutive process of finding the DAC generated control signals for all desired constellation points on RX side;

DETAILED DESCRIPTION

Figure 1A:
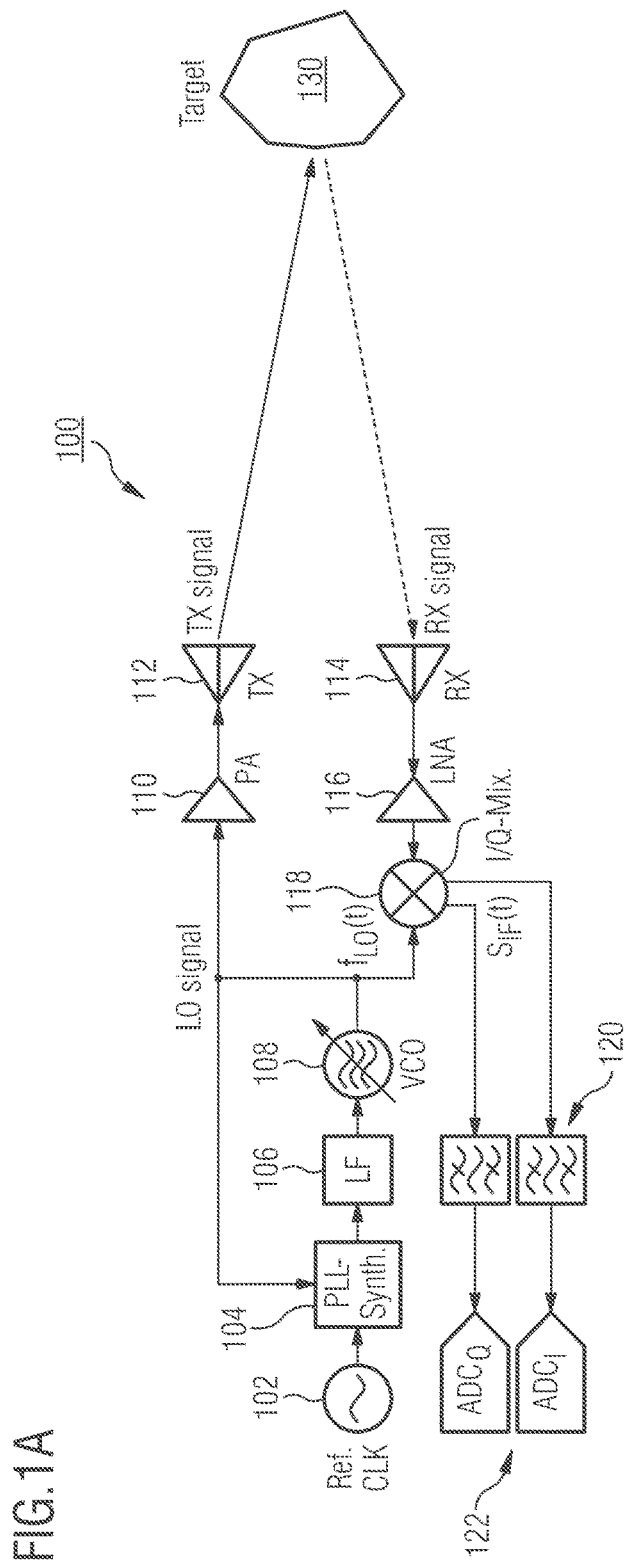

Various example embodiments will now be described more fully with reference to the accompanying drawings in which some example embodiments are illustrated. In the figures, the thicknesses of lines, layers and/or regions may be exaggerated for clarity.

Accordingly, while further embodiments are capable of various modifications and alternative forms, some example embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of further example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art, unless expressly defined otherwise herein.

In the following, some basics of FMCW radar systems, including single channel as well as multichannel (MIMO) operation, are briefly described. Such FMCW radar systems may be considered as one possible application of embodiments of the present disclosure. It should be noted that the proposed calibration method is based on the characteristics of the FMCW radar principle using a calibration target and a frequency ramp with high bandwidth (e.g. 1 GHz) However, the skilled person having benefit from the present disclosure will appreciate that embodiments may also be applicable to communications systems using IQ modulators other than radar systems. The concept proposed herein may be beneficial for calibrating transceivers using IQ modulators in the transmit (TX) path. Such transceivers may be found in FMCW radar systems and various other wireless communication devices, such as cellular phones, for example.

FIGS. 1A and 1B show a schematic block diagram of a single channel FMCW radar system or transceiver 100.

The FMCW radar transceiver 100 includes a transmitter (TX) portion and a receiver (RX) portion, both using the same continuous wave carrier frequency $f_{LO}(t)$. The skilled person will appreciate that carrier frequency $f_{LO}(t)$ is a frequency in the RF range, for example 77 GHz. Further, the carrier frequency $f_{LO}(t)$ is a frequency modulated continuous wave (FMCW) carrier frequency, i.e., the carrier frequency $f_{LO}(t)$ varies within a certain bandwidth $B_{SW}$. In the illustrated example, the carrier frequency $f_{LO}(t)$ ramps up and down according to a saw-tooth waveform. Note that in principle also other frequency ramps of the carrier frequency are possible, such as sine waves or triangular waves.

In the illustrated example, the linearly increasing RF frequency ramp is generated by a Voltage Controlled Oscillator (VCO) 108 which is controlled and stabilized by a Phase Locked Loop (PLL) synthesizer 104 in combination with a loop filter 106 and a reference clock 102. The output signal of the VCO 108, i.e. the FMCW carrier signal having frequency $f_{LO}(t)$, is distributed to the input of a Power Amplifier (PA) 110 in the TX path and to an LO port of an RX mixer 118. The amplified LO signal is transmitted via TX antenna 112, reflected by object 130, received via RX antenna 114, and amplified by a Low Noise Amplifier (LNA) 116 in the RX portion of the FMCW radar transceiver 100. The received and amplified signal is down converted to baseband or Intermediate Frequency (IF). In the example of FIGS. 1A and 1B an IQ RX mixer 118 is used. A resulting complex valued baseband or IF-signal $s_{IF}(t)$ is band-pass filtered 120 and digitized by Analog-to-Digital Converters (ADCs) 122. For digital signal processing a Fast Fourier transform (FFT) may be applied to the sampled baseband or IF data.

To illustrate the basic principle of an FMCW radar the transmitted and received RF waveforms of three consecutive frequency ramps are shown in the lower portion of FIGS. 1A and 1B. The resulting baseband or IF-signal $s_{IF}(t)$ for a static single target scenario is a sinusoidal signal with a frequency $f_{IF}$ which is proportional to the distance between target 130 and radar transceiver 100.

Figure 2A:
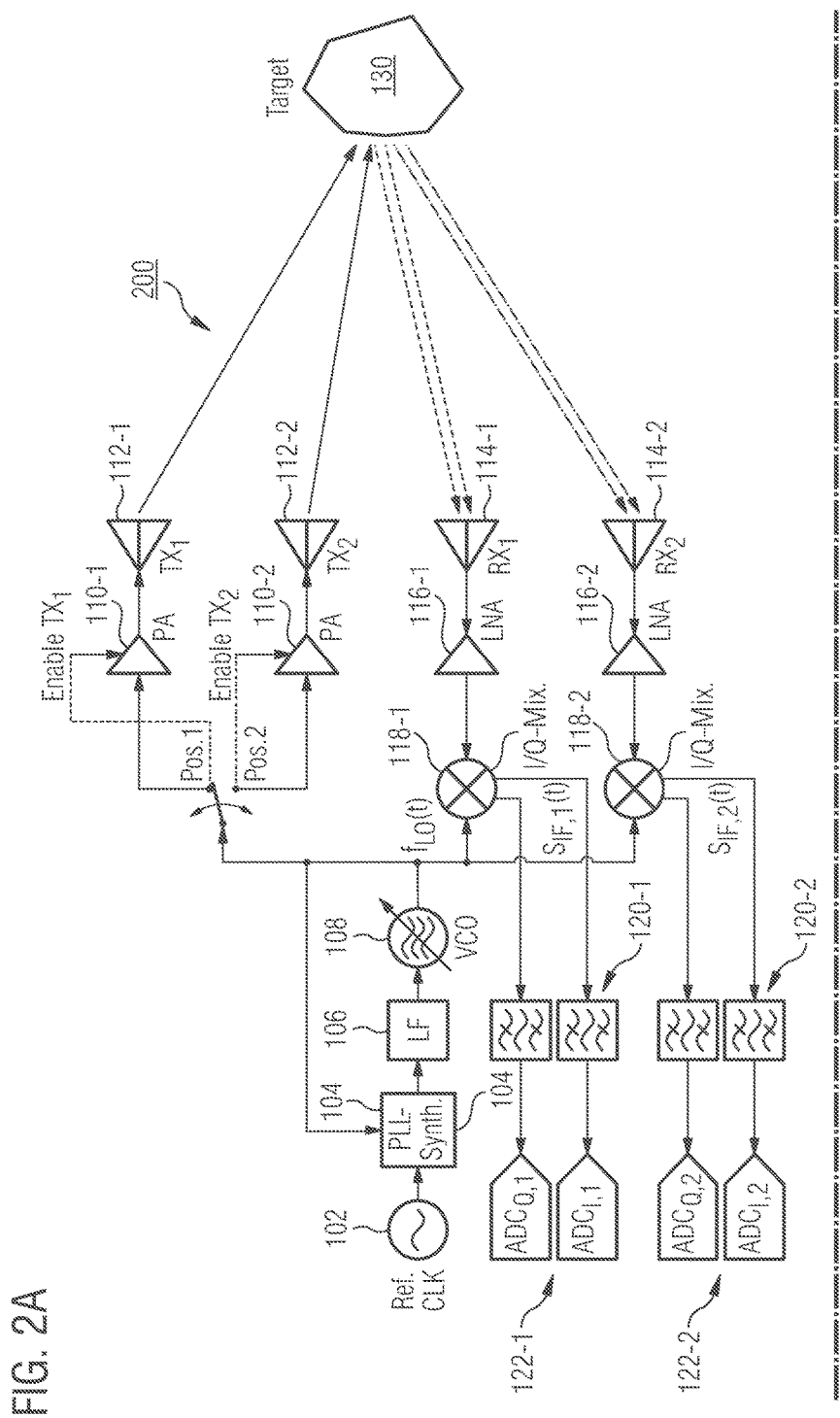

To increase the resolution of radar systems, e.g. to estimate an angular position of a target, so-called multichannel radar concepts may be employed. Turning now to FIGS. 2A and 2B, an example of a multichannel Time Division Multiple Access (TDMA) MIMO radar transceiver 200 will be explained.

The illustrated example radar transceiver 200 comprises two transmit paths $TX_1$, $TX_2$ as well as two receive paths $RX_1$, $RX_2$. The skilled person having benefit from the present disclosure will appreciate that also more TX paths and/or RX paths could be implemented. The MIMO principle requires the use of orthogonal TX waveforms in order to be able to separate respective signal reflections at the receiver. This means that in the RX signal the target responses caused by the different transmitters should be clearly assignable to the corresponding TX path.

A common and cost efficient solution is shown in FIGS. 2A and 2B. The two transmit paths $TX_1$, $TX_2$ are activated in consecutive time intervals. During a first time interval transmit path $TX_1$ is activated or enabled while transmit path $TX_2$ is mute. During a second consecutive time interval transmit path $TX_2$ is activated while transmit path $TX_1$ is mute, and so on. In contrast, the two receive paths $RX_1$, $RX_2$ are active or enabled simultaneously to receive slightly phase-shifted signal reflections from target 130 due to slightly different locations of the RX antennas 114-1, 114-2. In the TDMA MIMO radar concept of FIGS. 2A and 2B two consecutive ramps are necessary to get all required data (all combinations of transmitters and receivers) for Digital Beam Forming (DBF). Known methods of DBF may be used to estimate an angular position of the target 130. For that purpose phase differences caused by different round-trip delay-times (RTDTs) (different paths from all combinations of transmitters and receivers) are taken into account. Various DBF techniques are well known in the art. Therefore a detailed description of DBF is omitted for the sake of brevity. To avoid the rather time-consuming consecutive switching between the transmit paths $TX_1$, $TX_2$ an IQ modulator may be used as Single-Side-Band (SSB) mixer in the TX path. The IQ modulator concept will be described with regard to an example single channel heterodyne FMCW radar transceiver 300 of FIGS. 3A and 3B and an example dual channel FDMA FMCW radar transceiver 400 of FIGS. 4A and 4B.

Figure 3A:
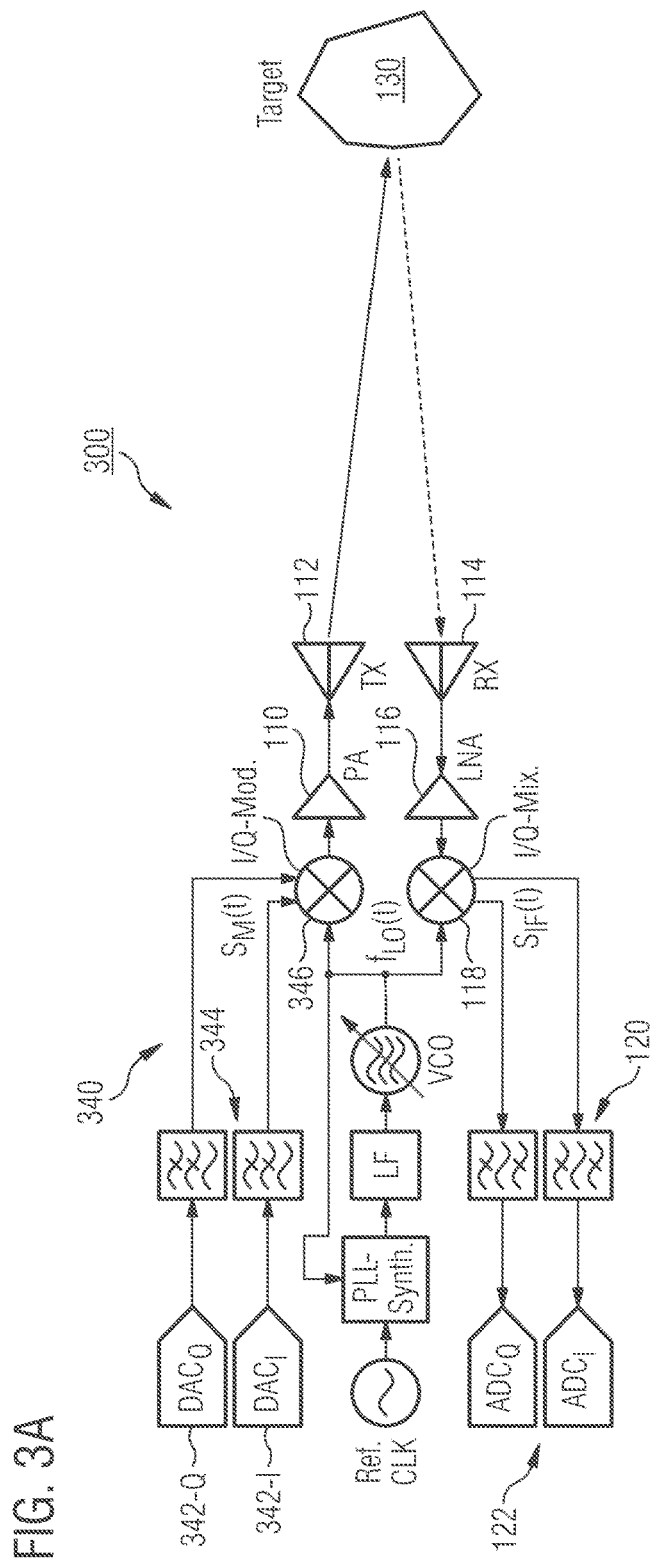
Figure 4A:
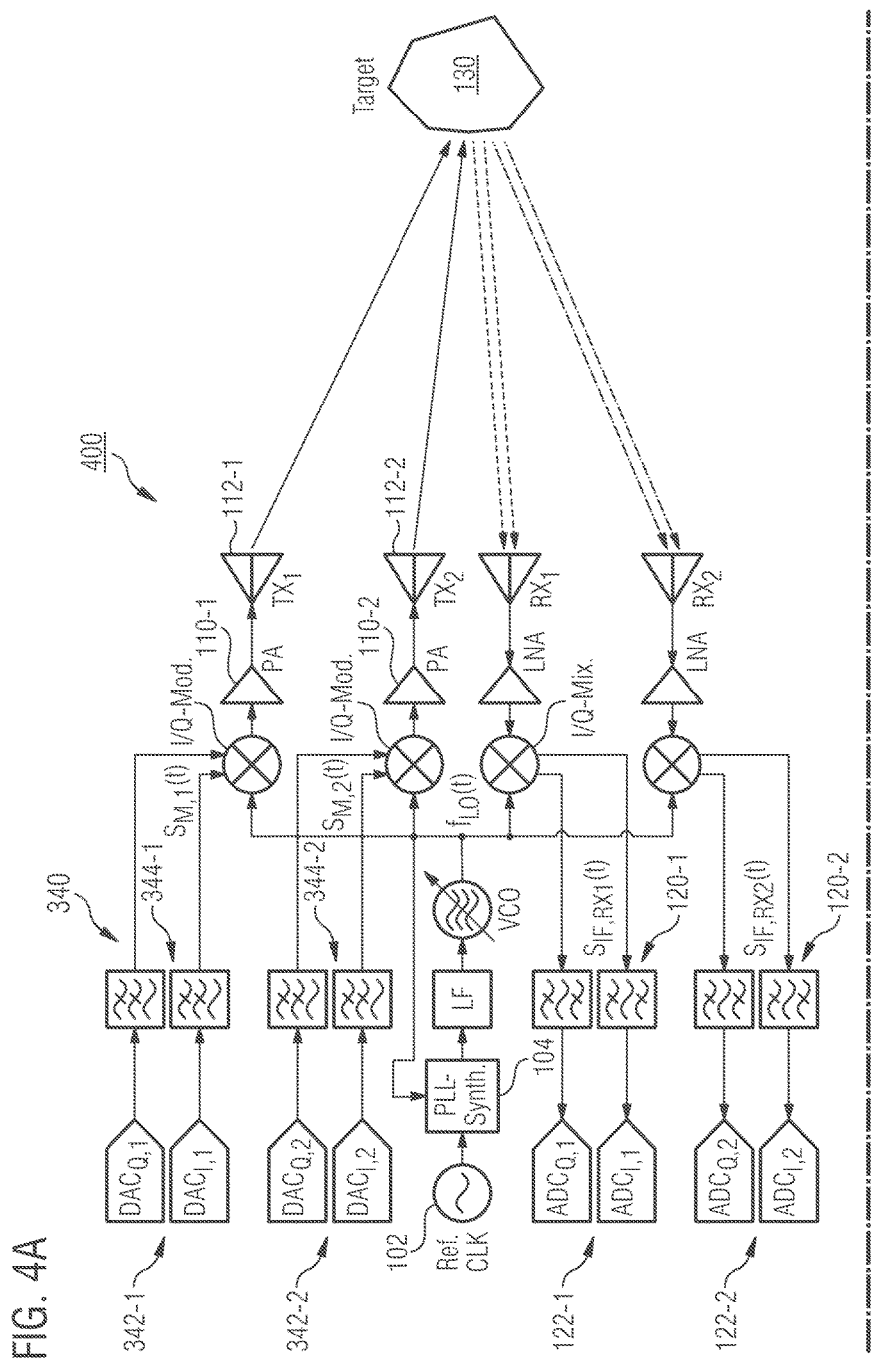

In FIGS. 3A and 3B, the FMCW carrier signal with varying frequency $f_{LO}(t)$ is additionally shifted in frequency by an arbitrary frequency offset value $f_{offset}$. For that purpose the TX path of FDMA FMCW radar transceiver 300 comprises an IQ modulator 340 which generates an IQ modulating signal $s_M(t)$ with a frequency corresponding to the frequency offset $f_{offset}$. This can be done, for example, by using an IQ modulating signal $s_M(t)$ generated from a circular constellation diagram. Circular constellation diagrams are known as representations of signals modulated by digital Phase-Shift Keying (PSK) modulation schemes, for example. In general, a constellation diagram displays the signal as a two-dimensional scatter diagram in the complex plane at symbol sampling instants. In a more abstract sense, it represents the possible symbols that may be selected by a given modulation scheme as points in the complex plane. To obtain an IQ modulating signal $s_M(t)$ with a frequency $f_{offset}$ subsequent digital I and Q baseband samples of the IQ modulating signal $s_M(t)$ may be chosen to correspond to adjacent constellation points of the circular constellation diagram in clockwise or counterclockwise direction. Adjacent constellation points of the circular constellation diagram may be separated in phase by 360°/M, wherein M denotes the size of the modulation symbol alphabet. For 8-PSK, for example, M=8.

The digital I and Q baseband samples corresponding to constellation points of the constellation diagram may be converted to analog signals by respective Digital-to-Analog Converters (DACs) 342-I, 342-Q. The output of the DACs may be controlled by respective control settings. The resulting analog I and Q signals constituting the modulating signal $s_M(t)$ may be low-pass filtered, respectively, before mixing the filtered modulating signal $s_M(t)$ with the FMCW carrier signal generated by VCO 108 to generate an IQ modulated transmit signal. Note that the IQ modulated transmit signal is a FMCW carrier signal with a frequency ramp and an additional frequency offset $f_{offset}$. The IQ modulated transmit signal is then amplified (PA 110) and transmitted via TX antenna 112, and reflected by object 130.

As has already been described, the reflected signal is received via RX antenna 114 and amplified by LNA 116. The received and amplified signal is down converted to baseband or IF. In the example of FIG. 3 an IQ RX mixer 118 is used. The resulting complex valued baseband or IF-signal $s_{IF}(t)$ is band-pass filtered 120 for extracting the beat frequency of the target response and digitized by ADCs 122. Again, an FFT may be applied to the sampled baseband or IF data. Compared to FIGS. 2A and 2B, however, the target response is now also shifted by the value $f_{offset}$. The reason is that the received signal is down-converted by the unmodulated FMCW carrier signal with frequency $f_{LO}(t)$, as can be seen in FIGS. 3A and 3B.

Applying different frequency offsets $f_{offset,1}, f_{offset,2}$ to different TX paths $TX_1$, $TX_2$ may enable orthogonality and hence simultaneous activation and operation of the different TX paths $TX_1$, $TX_2$, hence FDMA. In fact the TX signals of TX paths $TX_1$, $TX_2$ are nearly orthogonal, as they are only orthogonal within an unambiguous range, which is defined as the bandwidth between two consecutive offset frequencies. The target responses caused by the different transmitters $TX_1$, $TX_2$ are then separated in frequency due to the different frequency offsets $f_{offset,1}, f_{offset,2}$. As can be seen from the example of FIGS. 4A and 4B, only one measurement interval corresponding to only one frequency ramp is necessary to get all information required for DBF.

FIG. 5A shows a block diagram of an example implementation of an IQ modulator 340.

The LO-signal, e.g. the FMCW carrier signal generated by VCO 108, is split in two signal paths (I-path and Q-path). A relative phase shift of 90° is applied between the I- and the Q-paths. These phase shifted LO-signals are used as input signals of two mixers 346-I, 346-Q. The mixer 346-I in the I-path is used for the up conversion of the I-component $Re\{s_M(t)\}$ and the other 346-Q is used for the up conversion of the Q-component $Im\{s_M(t)\}$ of the modulating signal $s_M(t)$.

An example of a 4-QAM (QAM: Quadrature Amplitude Modulation) constellation diagram 500 also shown in FIG. 5A. For 4-QAM the constellation diagram 500 has four constellation points, as can be seen from FIG. 5A. Each complex-valued constellation point can be represented by its I- and Q-components. Measured constellation diagrams can be used to recognize the type of interference and distortion in a signal. Typically IQ modulators have non ideal behavior. Common sources of error and their influence on RF signals are illustrated by measured constellation diagrams shown in FIGS. 5B, 5C, and 5D. FIG. 5B illustrates the effect of DC Offset in 4-QAM and 16-QAM signals, FIG. 5C illustrates the effect of quadrature skew in 4-QAM, 16-QAM signals, and FIG. 5D illustrates the effect of IQ gain imbalance in 4-QAM, 16-QAM signals.

As described above, IQ modulators may be used to generate orthogonal TX waveforms for multichannel FDMA FMCW radar transceivers, for example. Therefore different frequency offsets $f_{offset,channel}$ may be applied to the LO signal using the IQ modulator as an SSB mixer. The performance of the IQ modulators directly influences the achievable radar system performance Unwanted harmonics caused by non-ideal behavior (e.g., non-linearities) of the IQ-modulators may appear in the calculated IF spectra (range compression) as ghost targets (see FIG. 6A).

Conventional calibration methods are based on model assumptions. Measurements of constellation diagrams, such as shown by FIGS. 5B-5D, are used to calculate predistortion parameters to compensate for DC offsets, quadrature skew, and IQ gain imbalances. Often separate and external measurement equipment has to be used to carry out the required measurements. Conventional model based calibration approaches may not be sufficient to achieve the high suppression of spectral components caused by nonlinearities as they only account for DC offsets, quadrature skew, and IQ gain imbalances.

FIG. 6B shows a conventional radar measurement setup 600 which is commonly used for calibration of an IQ modulator. The setup 600 comprises a single channel FMCW radar transceiver 300 and separate external measurement equipment 610. Note that the frequency of the RF signal is kept constant during this measurement.

The DACs 342-I, 342-Q of FMCW radar transceiver 300 generate control signals corresponding to constellations points of a certain constellation diagram 650. For the control signal generation it is assumed that the IQ modulator 340 and the TX path have ideal behavior. Based on the externally measured receive (RX) constellation diagram 660 one or more pre-distortion parameters may be calculated. For that purpose a predefined model is typically used which takes the DC offsets, quadrature skew, and IQ gain imbalances into account.

Embodiments proposed in the present disclosure aim at improving such conventional calibration concepts in order to reduce sources of errors caused by non-linearities that are not covered by model based calibration approaches.

Turning now to FIG. 7, a method 700 for calibrating an IQ modulator 340 according to an embodiment will be described in more detail. The skilled person having benefit from the present disclosure will appreciate that the IQ modulator may be an IQ modulator of a radar transceiver or an IQ modulator or another transceiver device.

Method 700 includes the following acts:

setting 702 one or more control values of the IQ modulator 340 corresponding to a desired constellation point of a constellation diagram to generate an IQ modulating signal $s_M(m)$, with m denoting the constellation point index, mixing 704 the IQ modulating signal $s_M(m)$ with a carrier signal to generate an IQ modulated transmit signal, transmitting 706 the IQ modulated transmit signal towards a predefined object or target at a predefined location, receiving 708 a reflection of the IQ modulated transmit signal from the predefined object or target, mixing 710 the received reflection of the IQ modulated transmit signal with the carrier signal to generate a down-converted receive signal (e.g. a target response), comparing 712 an amplitude and/or phase of the down-converted receive signal (e.g. the target response) with the desired constellation point of the constellation diagram, adjusting 714 the one or more control values of the IQ modulator until a deviation between the amplitude and/or phase of the received down-converted signal (e.g. the target response) and the desired constellation point falls below a predefined threshold.

Thereby the acts of method 700 may be performed iteratively for each desired constellation point of the constellation diagram until the deviation between the amplitude and/or phase of the down-converted receive signal and the desired constellation point falls below the predefined threshold. If the constellation diagram comprises more than one constellation point (which will be the typical case) the respective sequence of acts 702-714 may be performed iteratively to calibrate control values of the IQ modulator for each constellation point of interest.

When calibrating FMCW radar systems the carrier signal may be an RF carrier signal generated by varying a carrier frequency of the carrier signal according to a predefined carrier frequency ramp. In other words, the RF carrier signal may be a frequency ramp. As has been explained before, the carrier frequency ramp may have a sawtooth-like shape, for example. To generate an additional frequency offset $f_{offset,channel}$ to the LO signal (carrier signal) by mixing it with the IQ modulating signal $s_M(t)$ the constellation diagram is preferably a circular constellation diagram.

Figure 8A:
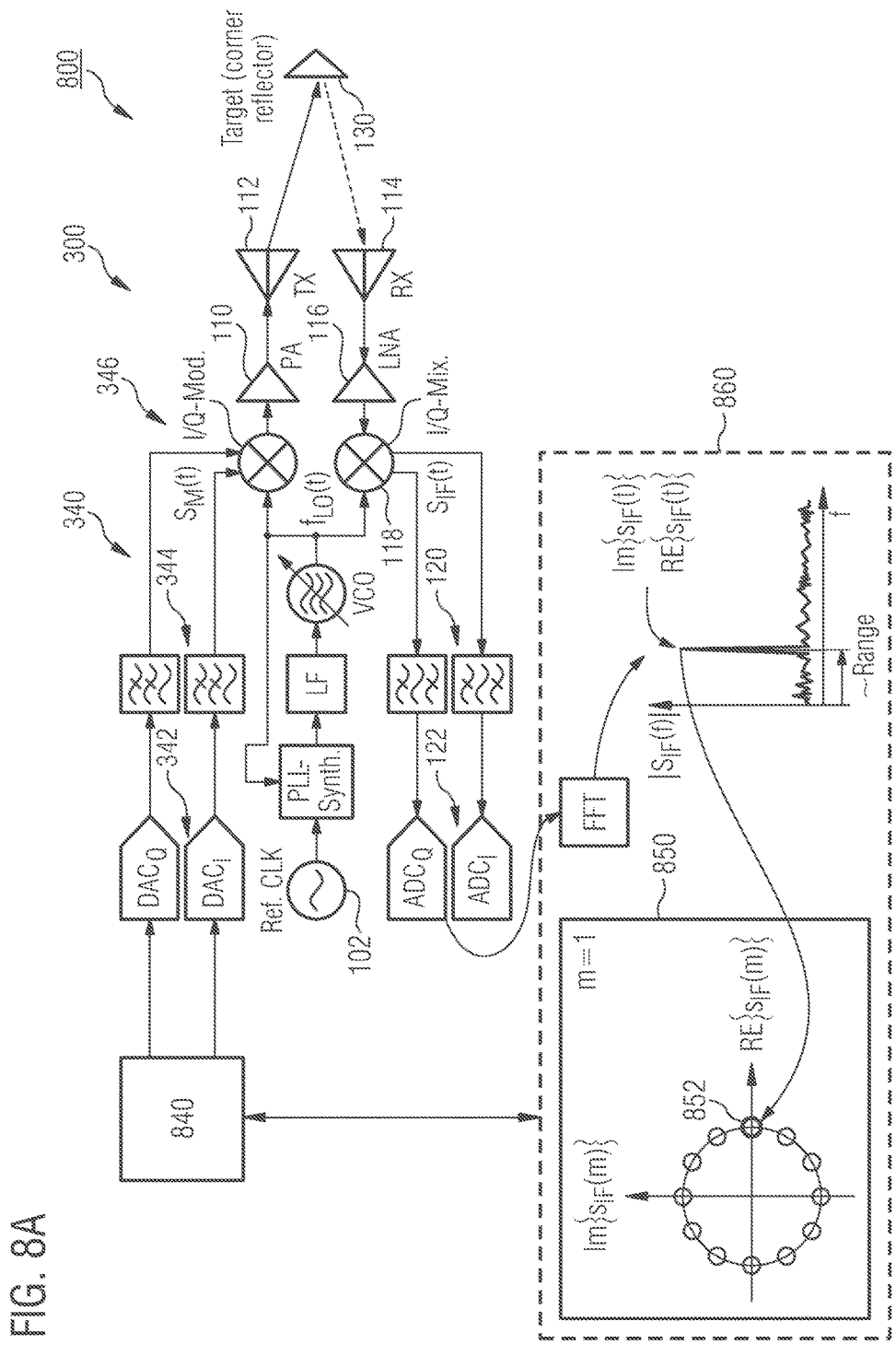
FIG. 8A illustrates a calibration setup according to an embodiment.

A calibration system 800 according to an embodiment is shown in FIG. 8A. The calibration system 800 may perform calibration method 700. This example setup includes a FMCW radar transceiver 300 and a predefined object/target 130 at a predefined location.

Radar calibration system 800 comprises an IQ modulator 340. A controller 840 is configured to set one or more control values, e.g. DAC control values, of the IQ modulator 340 corresponding to a desired constellation point 852 of a constellation diagram 850 to generate an IQ modulating signal $s_M(t)$. A first IQ mixer 346 is configured to mix the I- and Q-components of the IQ modulating signal $s_M(t)$ with respective I- and Q-components of a FMCW carrier signal to generate an IQ modulated transmit signal. Transmitter circuitry including PA 110 and TX antenna 112 is configured to transmit the IQ modulated transmit signal towards the predefined object 130 at a predefined location. For predefined reflection conditions the predefined object 130 may be located in an anechoic chamber, for example. Receiver circuitry of the radar transceiver 300 including RX antenna 114 and LNA 116 is configured to receive a reflection of the IQ modulated transmit signal from the predefined object 130. A second IQ mixer 118 is configured to mix the received reflection of the IQ modulated transmit signal with the (non IQ-modulated) FMCW carrier signal to generate a down-converted receive signal. The down-converted receive signal may be a baseband signal. A processor 860 is configured to compare an amplitude and/or phase of the down-converted receive signal with the desired constellation point 852 of the constellation diagram 850 and is configured to adjust the one or more control values of the IQ modulator 340 until a deviation between the amplitude and/or phase of the received down-converted signal and the desired constellation point 852 falls below a predefined threshold. In some embodiments, the processor 860 and the controller 840 may be coupled via an interface for closing a feedback-loop. That is, the processor 860 may instruct the controller 840 to adjust the IQ modulator control signals (e.g., DAC settings).

In the setup of FIG. 8A, the IQ modulated transmit signal is transmitted using a transmitter portion of a transceiver hardware, while the reflection of the IQ modulated transmit signal is received using a receiver portion of the same transceiver hardware. Said transceiver hardware is embedded in the same radar sensor 300 in the illustrated embodiment. Hence, no external measurement equipment is needed.

At the starting point of the proposed iterative process 700 the desired constellation diagram 850 at the baseband or IF-output is defined. As some embodiments of the method 700 are intended to be used for FDMA FMCW radar operation, a circular constellation diagram 850 may be chosen (see FIG. 8A). Here, the example constellation diagram 850 comprises twelve constellation points. However, any number of constellation points is possible. The proposed calibration method requires the use of a static calibration target 130 located at a fixed range from the radar transceiver 300 to be calibrated. FMCW radar measurements are carried out which means that during the duration of one RF ramp the control signals of the IQ modulator 340 remain constant. A time-to-frequency transformation, for example an FFT, of the sampled IF-data may be performed in order to estimate the values of I and Q of the received constellation point. In the spectra of the range compressed data the amplitude and phase information can be found at the peak value of the target response which are equivalent to the I and Q values of the constellation point.

Figure 8B:
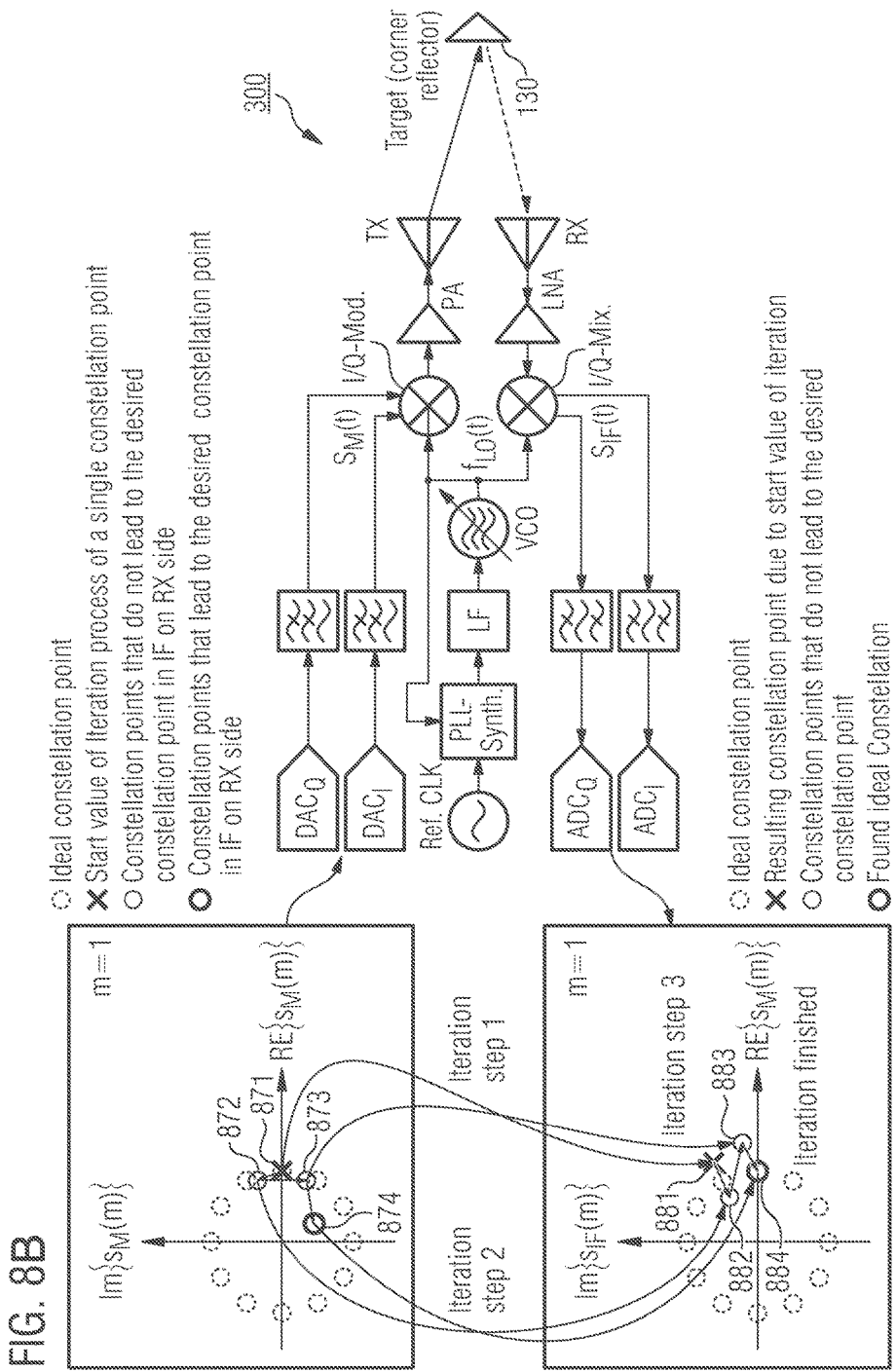
FIG. 8B illustrates a second step in a calibration process according to an embodiment and an iterative process of finding DAC generated control signals for a desired constellation point on RX side.

The iterative calibration process starts with the calibration of IQ modulator control signals for a first constellation point m=1, as shown in FIG. 8B. The start value of the control signal(s) (Re{$s_M$(m)}; Im{$s_M$(m)}, with m=1 denoting the first constellation point) of the IQ modulator 340 is marked as cross 871. If the deviation between the desired (e.g. ideal) constellation point and actually received (RX) constellation point 881 is too high, the IQ modulator control signal(s) of the first constellation point is modified and the resulting RX constellation point is measured again (circles 882, 883) at the receiver side. This procedure may be repeated until the desired constellation point 884 is received. The required predistorted IQ modulator control signals (e.g., TX DAC settings) 874 corresponding to the desired RX constellation point 884, hence the predistorted control value(s) (Re{$s_M$(m)}; Im{$s_M$(m)}, with m=1 denoting the first constellation point), may be stored in a memory.

Figure 10A:
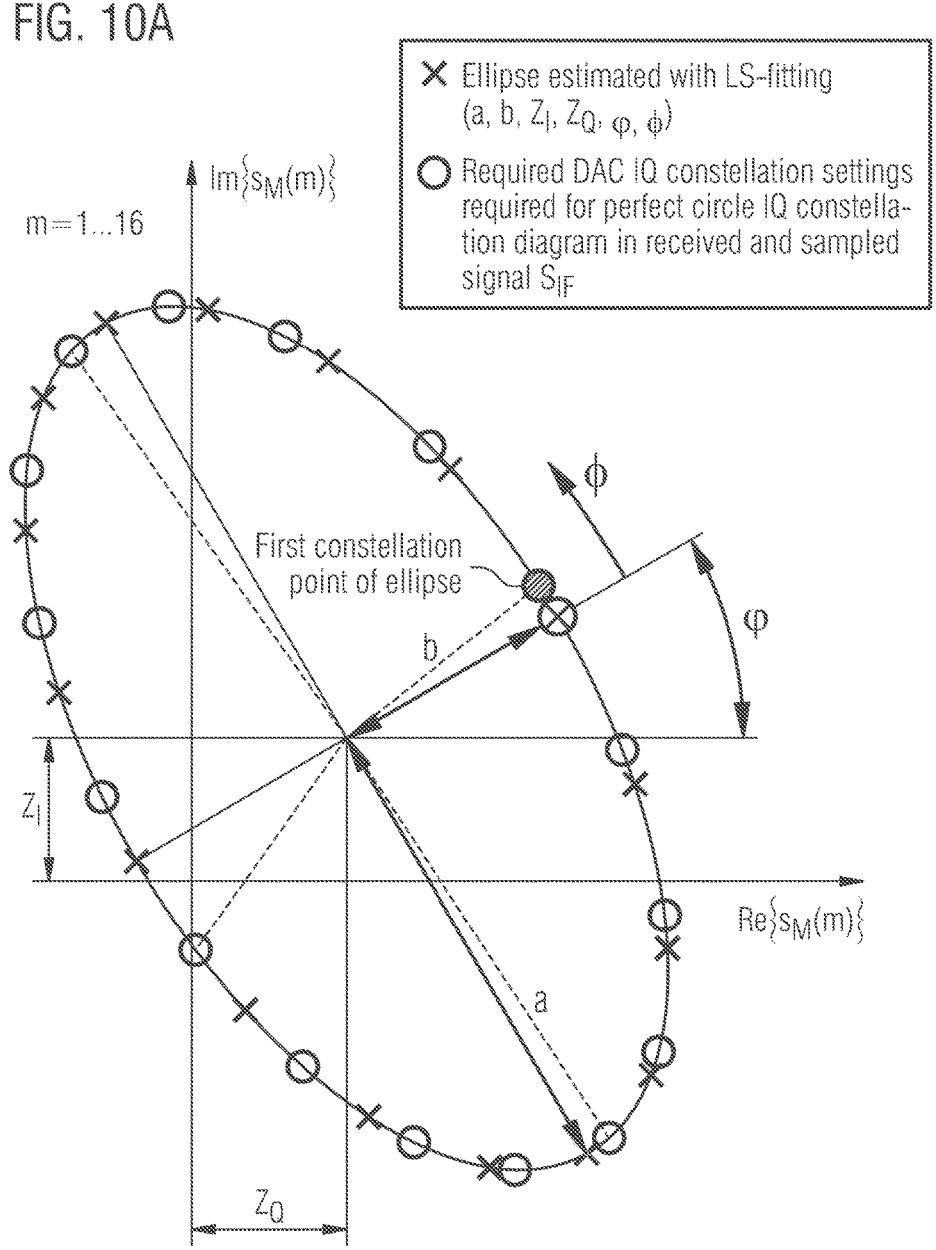
FIG. 10A shows DAC settings for perfect circle on RX side and ellipse estimated with LS-fitting.

This iterative procedure may be repeated for all other constellation points m=2 . . . 12 of the example constellation diagram 850, as shown in FIG. 9. A result of this iterative calibration procedure is shown in FIG. 10A. The required predistorted IQ modulator control signals (e.g., TX DAC settings) for the desired RX constellation points are marked with circles in the upper predistorted constellation diagrams, while the corresponding RX constellation points are marked with circles in the lower predistorted constellation diagrams of FIG. 9. It can be seen in the illustrated example that the predistorted IQ modulator control signals, i.e., the predistorted TX constellation diagram 900, have an ellipsoid form, while the RX constellation points are located on a desired circle 910.

In an optional further act of method 700, a curve fitting based on respective adjusted or predistorted control values of the IQ modulator corresponding to respective desired RX constellation points of the constellation diagram may be performed. The parameters describing the estimated predistortion curve may be stored in a computer memory, for example. In some embodiments related to circular constellation diagrams, a Least-Square (LS) ellipse fit may be performed, for example. The LS-estimated positions of the predistorted IQ modulator control signals that are required for a perfect RX constellation diagram are marked with crosses in FIG. 10A. Example ellipse parameters of the LS-fitting can be found in Table 1.

TABLE 1

| | Ellipse parameters. |
|---|---|
| a | semi-major axis |
| b | semi-minor axis |
| $Z_I$ | center |
| $Z_Q$ | center |
| φ | twisting angle |
| ϕ | angle relative to semi-major axis |

Figure 10B:
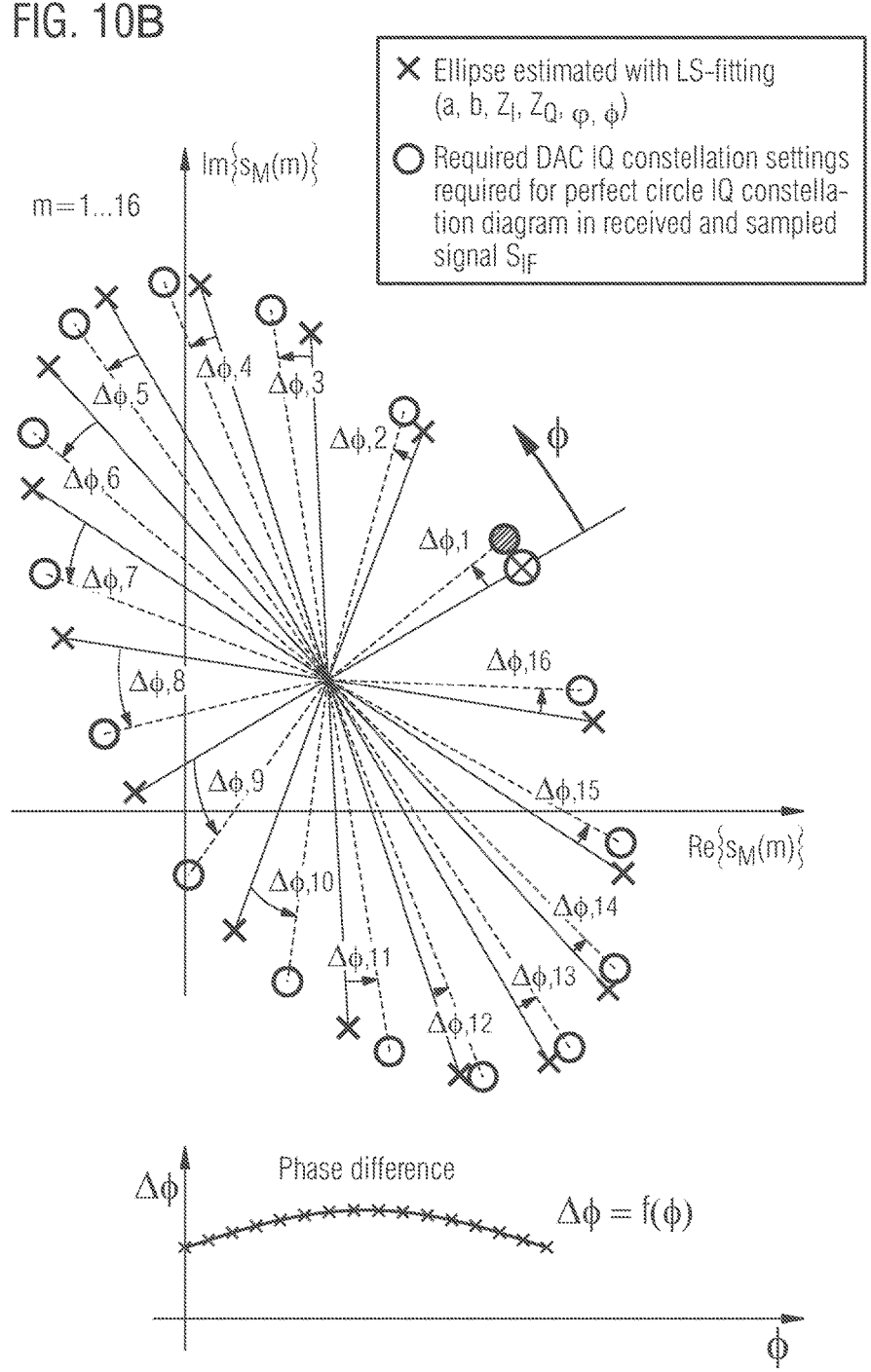
FIG. 10B illustrates phase differences $\Delta\phi$ of DAC settings for perfect circle on RX side and ellipse estimated with LS-fitting.

As can be seen from FIG. 10B, the positions of the predistorted IQ modulator control signals or DAC settings in the constellation diagram required for a perfect RX circle (circles) differ from the estimated LS-positions on the LS-estimated ellipse (crosses). This is caused by nonlinearities of the IQ modulator. In an optional additional step of the calibration method, the phase differences $\Delta\phi_i$ between the found predistorted IQ modulator control values (for example, DAC settings) for a perfect RX constellation circle and the estimated LS-positions may be calculated for each constellation point i of the IQ modulator control values (see FIG. 10B). After that, a function $\Delta\phi=f(\phi)$ with input parameter $\phi$ for the phase deviation $\Delta\phi$ may be calculated and stored by methods of regression analysis, for example. In this way, the optimum predistorted IQ modulator control values (for example, DAC settings) may be set during normal operation based on the stored ellipse parameters and based on the respective predistorted IQ modulator control value's angle $\phi$ relative to semi-major axis (to obtain $\Delta\phi=f(\phi)$).

To summarize, summarize, some embodiments propose to characterize/calibrate a transmitter by performing a real radar measurement with the complete radar system. The radar system may be put into a well-known environment, e.g. an anechoic chamber with one static radar target with known radar cross section (for example, a corner reflector). The measurement results may then be used to characterize the transmitter and derive the optimum compensation parameters.

The measurement may be performed by transmitting an FMCW ramp covering the desired operating bandwidth $B_{SW}$, and receiving the reflected signal by the system under test. The complete radar system is involved so that any imperfections which might be present in the transmitter, receiver, antennas, signal processing chain, etc. can be covered by the proposed calibration concept. The measurement is also covering the complete frequency band $B_{SW}$ of interest, intrinsically weighting and averaging over frequency-dependent effects in exactly the same way as the operating radar does. Furthermore, a real radar measurement is performed, requiring no other external RF equipment and utilizing the RF, analog and digital signal processing of the system under test. In this way, the desired data may be collected in the fastest possible way (for example, 'real-time').

The received signal will contain the echo from the reflector at a precisely known frequency. The amplitude and phase of this echo contains the desired data for instantaneous (or later) compensation, and may be collected by the test setup (for example, a computer) which controls the radar system for this characterization. The amplitudes and phases of the received echo, which correspond to the transmitter settings, are used to obtain the required pre-distortion parameters.

The proposed real-time approach tries try to find the correct I/Q modulator settings to obtain the desired RF constellation points by an iterative process. The settings of the I/Q modulator may be varied (by an iterative method minimizing the remaining error) until the desired optimum constellation is received.

To get the full characteristics of a transmitters amplitude and phase modulator (or I/Q modulator), a reasonable number of modulation settings may be applied to the transmitter, and one radar measurement may be performed for each setting. In one embodiment, the results (of both methods) are the parameters of an elliptic pre-distortion for I and Q. In combination, a phase pre-distortion is applied.

Care has to be taken that the distance to the corner reflector does not change, which is usually guaranteed by a rigid mechanical connection between radar system and corner reflector. Thus, any deviation in amplitude and phase between transmit setting and received signal originates from the system itself and can be compensated since it is now precisely known.

Embodiments of the present disclosure propose usage of the already existing hardware in a transceiver, which may be a radar transceiver, for example. The desired mode of transceiver operation (e.g. FDMA FMCW radar) may be used. In the proposed approach, an iteration process may be used to find the perfect settings for the control signals $s_M(t)$ of the IQ modulator in the complex IQ plane to achieve the best received signal. An identical signal (e.g. power level of the signal) may then also be used in normal radar operation. The iterative process has very quick convergence and has very low calculation complexity.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order.

Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A method for calibrating an IQ modulator, the method comprising:
   a) setting one or more control values of the IQ modulator corresponding to a desired constellation point of a constellation diagram to generate an IQ modulating signal;
   b) mixing the IQ modulating signal with a carrier signal to generate an IQ modulated transmit signal;

c) transmitting the IQ modulated transmit signal towards a predefined object at a predefined location;
d) receiving a reflection of the IQ modulated transmit signal from the predefined object;
e) mixing the received reflection of the IQ modulated transmit signal with the carrier signal to generate a down-converted receive signal;
f) comparing an amplitude and/or phase of the down-converted receive signal with the desired constellation point of the constellation diagram; and
g) adjusting the one or more control values of the IQ modulator until a deviation between the amplitude and/or phase of the down-converted receive signal and the desired constellation point falls below a predefined threshold.

2. The method of claim 1, wherein acts f) and g) are performed iteratively until the deviation between the amplitude and/or phase of the down-converted receive signal and the desired constellation point falls below the predefined threshold.

3. The method of claim 1, further comprising:
performing acts a) g) for each constellation point of the constellation diagram.

4. The method of claim 1, further comprising:
generating the carrier signal by varying a carrier frequency of the carrier signal according to a predefined carrier frequency ramp.

5. The method of claim 4, wherein the one or more control values of the IQ modulator are kept constant during a duration of one carrier frequency ramp.

6. The method of claim 1, further comprising:
performing a time-to-frequency domain transformation of the down-converted receive signal.

7. The method of claim 1, further comprising:
storing one or more control values corresponding to the desired constellation point when the deviation between the amplitude and/or phase of the down-converted receive signal and the desired constellation point falls below the predefined threshold.

8. The method of claim 1, further comprising:
performing a curve fitting to generate an estimated curve based on respective adjusted values of the IQ modulator corresponding to respective desired constellation points of the constellation diagram and storing parameters describing the estimated curve.

9. The method of claim 1, wherein the IQ modulated transmit signal is transmitted using a transmitter portion of a transceiver hardware and wherein the reflection of the IQ modulated transmit signal is received using a receiver portion of said transceiver hardware.

10. The method of claim 9, wherein the transceiver hardware is embedded in a radar sensor.

11. The method of claim 1, wherein the predefined object is located in an anechoic chamber.

12. A calibration system, comprising:
an IQ modulator;
a controller configured to set one or more control values of the IQ modulator corresponding to a desired constellation point of a constellation diagram to generate an IQ modulating signal;
a first mixer configured to mix the IQ modulating signal with a carrier signal to generate an IQ modulated transmit signal;
transmitter circuitry configured to transmit the IQ modulated transmit signal towards a predefined object at a predefined location;
receiver circuitry configured to receive a reflection of the IQ modulated transmit signal from the predefined object;
a second mixer configured to mix the received reflection of the IQ modulated transmit signal with the carrier signal to generate a down-converted receive signal;
a processor configured to compare an amplitude and/or phase of the down-converted receive signal with the desired constellation point of the constellation diagram and configured to adjust the one or more control values of the IQ modulator until a deviation between the amplitude and/or phase of the down-converted receive signal and the desired constellation point falls below a predefined threshold.

13. The calibration system of claim 12, wherein the transmitter circuitry and the receiver circuitry are portions of a transceiver module of a radar system.

14. The calibration system of claim 13, wherein the radar system is a Frequency-Modulated Continuous-Wave (FMCW) radar system comprising a carrier signal generator configured to generate the carrier signal by varying a carrier frequency of the carrier signal according to a predefined carrier frequency ramp over a predefined period of time.

15. The calibration system of claim 12, wherein the processor is configured to perform a Fast Fourier Transformation (FFT) of the down-converted receive signal and to derive I and Q values of a received constellation point from a frequency domain signal.

* * * * *